United States Patent
Keohane et al.

(10) Patent No.: US 7,856,662 B2
(45) Date of Patent: *Dec. 21, 2010

(54) DENYING UNAUTHORIZED ACCESS TO A PRIVATE DATA PROCESSING NETWORK

(75) Inventors: Susann Marie Keohane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 12/114,763

(22) Filed: May 3, 2008

(65) Prior Publication Data
US 2008/0235777 A1     Sep. 25, 2008

Related U.S. Application Data

(63) Continuation of application No. 10/611,023, filed on Jul. 1, 2003, now Pat. No. 7,386,887.

(51) Int. Cl.
G06F 11/00 (2006.01)
G06F 12/14 (2006.01)
G06F 12/16 (2006.01)
G08B 23/00 (2006.01)

(52) U.S. Cl. .......................... 726/23; 726/19
(58) Field of Classification Search .................. 726/19, 726/22, 23, 24, 25
See application file for complete search history.

(56) References Cited

U.S. PATENT DOCUMENTS

| | | | | |
|---|---|---|---|---|
| 5,896,499 A | * | 4/1999 | McKelvey | 726/11 |
| 5,926,529 A | * | 7/1999 | Hache et al. | 379/114.14 |
| 6,119,236 A | * | 9/2000 | Shipley | 726/22 |
| 6,202,153 B1 | * | 3/2001 | Diamant et al. | 726/35 |
| 6,219,706 B1 | * | 4/2001 | Fan et al. | 709/225 |
| 6,268,789 B1 | * | 7/2001 | Diamant et al. | 340/5.74 |
| 6,279,113 B1 | * | 8/2001 | Vaidya | 726/23 |
| 6,789,113 B1 | * | 9/2004 | Tanaka | 709/223 |
| 6,789,202 B1 | * | 9/2004 | Ko et al. | 726/23 |
| 6,988,208 B2 | * | 1/2006 | Hrabik et al. | 726/23 |
| 7,007,301 B2 | * | 2/2006 | Crosbie et al. | 726/23 |
| 7,042,852 B2 | * | 5/2006 | Hrastar | 370/310 |
| 7,089,424 B1 | * | 8/2006 | Subbiah | 713/189 |
| 7,089,590 B2 | * | 8/2006 | Judge et al. | 726/22 |
| 7,134,141 B2 | * | 11/2006 | Crosbie et al. | 726/23 |
| 2002/0162026 A1 | * | 10/2002 | Neuman et al. | 713/201 |
| 2002/0178383 A1 | * | 11/2002 | Hrabik et al. | 713/201 |
| 2003/0084321 A1 | * | 5/2003 | Tarquini et al. | 713/200 |
| 2003/0149887 A1 | * | 8/2003 | Yadav | 713/200 |
| 2003/0167410 A1 | * | 9/2003 | Rigstad et al. | 713/201 |
| 2004/0015719 A1 | * | 1/2004 | Lee et al. | 713/201 |
| 2004/0111638 A1 | * | 6/2004 | Yadav et al. | 713/201 |
| 2005/0039047 A1 | * | 2/2005 | Raikar et al. | 713/201 |

* cited by examiner

*Primary Examiner*—David Garcia Cervetti
(74) *Attorney, Agent, or Firm*—Matthew B. Talpis; Gregory K Goshorn; Greg Goshorn, P.C.

(57) ABSTRACT

Systems and methods for denying access to a data processing system by an intruder are provided. Input/output (I/O) on the intruder's connection may be taken over and responses mimicking a local terminal session passed back. On an attempted reconnect by the intruder, the user name and password used by the intruder to access the system may be captured. The password may then be changed on the edge system and the intruder's terminal session disconnected, or alternatively, continue to log the intruder's activity.

13 Claims, 5 Drawing Sheets

DENYING UNAUTHORIZED ACCESS TO A PRIVATE DATA PROCESSING NETWORK

CROSS-REFERENCES TO RELATED APPLICATIONS

The present application is a continuation application of pending U.S. patent application Ser. No. 10/611,023, now U.S Pat. No. 7,386,887, entitled, "System and Method for Denying Unauthorized Access to a Private Data Processing Network," filed on Jul. 1, 2003, which is assigned to the assignee of the present invention. The present application claims priority benefits to U.S. patent application Ser. No. 10,611,023.

TECHNICAL FIELD

The present invention relates in general to data processing systems and in particular to a mechanism for denying access to an enterprise network or other private network by an unauthorized intruder ("hacker").

BACKGROUND INFORMATION

In modern data processing systems, particularly with respect to enterprise networks, attacks against the network by unauthorized intruders are a continuing problem. This problem is made particularly acute by the Internet, and the necessity for enterprises to have Internet connectivity. Typically, enterprise networks employ an intrusion detection system (IDS) to monitor the network. Typically an IDS will simply page a system administrator or log the incident. More sophisticated systems may terminate the unauthorized connection and deny future logins. However, such intrusion prevention schemes are unworkable if the compromised login happens to be "root."

Moreover, typical IDS operate on a system-by-system basis. That is, each system attached to the enterprise network performs its own IDS function. However, an intruder may have broken into an edge node, snooped passwords on the enterprise network, and then connected to the next node via a Telnet session. (It would be recognized by those of ordinary skill in the art that Telnet is the protocol within the TCP/IP suite of protocols that establishes a emulated terminal session between two network systems.) Thus, although an intruder may be denied access to the most sensitive nodes via their respective IDS, the intruder may still have access to a multiplicity of nodes on the enterprise system.

Therefore, there is a need in the art for systems and methods to deny access to potential intruders at the edge node. As described further hereinbelow in conjunction with FIG. 1, an edge node connects the enterprise network to an external network such as the Internet.

SUMMARY OF THE INVENTION

The aforementioned needs are addressed by the present invention. Accordingly, there is provided in one embodiment of the present invention a method for denying an intruder access to a data processing system. The method includes receiving a socket identifier from an intruder detection system and passing a "broken connection" message back to the intruder. Responses are output on the socket in reply to intruder input, the responses having characteristics of a local terminal session. The method listens for a login request to the edge node of the data processing system by the intruder.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
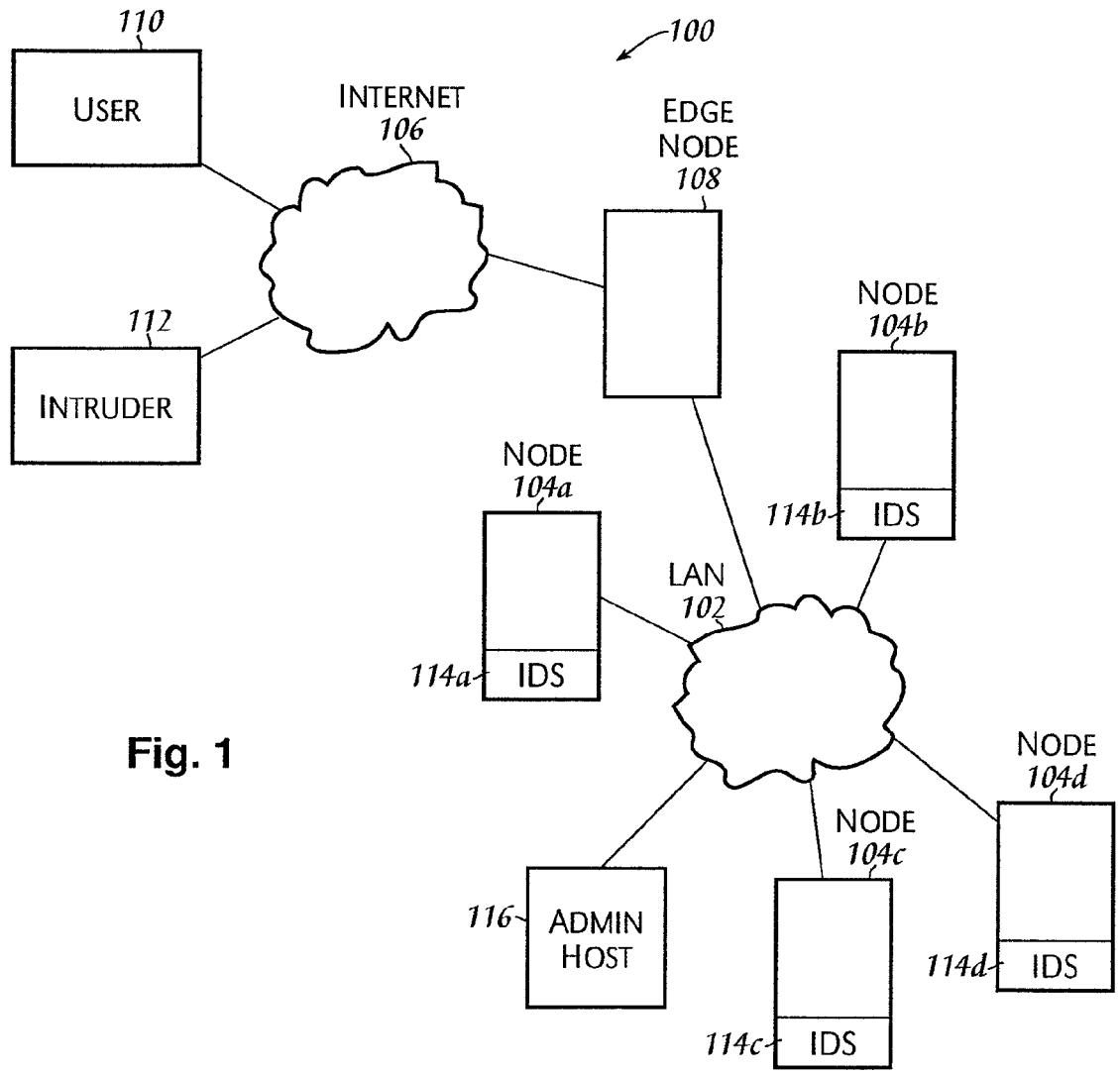
FIG. 1 illustrates, in block diagram form, a simplified Internet data processing environment which may be used in conjunction with the present inventive principles.

Systems and methods for denying access to a data processing system by an intruder are provided. A privileged process may take over input/output (I/O) on the intruder's connection and "mimic" a local terminal session. On an attempted reconnect by the intruder, the user name and password used by the intruder to access the system may be captured. The password may then be changed on the edge system and the intruder's terminal session disconnected, thereby precluding access by the intruder.

In the following description, numerous specific details are set forth so as to provide a thorough understanding of the present invention. For example, particular interprocess communication (IPC), or communication protocols may be referred to; however, it would be recognized by those of ordinary skill in the art that the present invention may be practiced without such specific details, and, in other instances, well-known circuits have been shown in block diagram form in order not to obscure the present invention in unnecessary detail. Refer now to the drawings, wherein depicted elements are not necessarily shown to scale and wherein like or similar elements are designated by the same reference numeral through the several views.

FIG. 1 illustrates, in block diagram form a schematic Internet data processing system 100, which may be used in conjunction with the present invention. System 100 is exemplary and illustrates a common architecture for an enterprise network, here depicted by local area network (LAN) 102. It would be appreciated by those of ordinary skill in the art that such an enterprise network, or, more generally any private network, may also be implemented as a wide area network (WAN), or a set of internetworked LANs, for example. It would be further appreciated that these architectural differences do not implicate the present inventive principles to be discussed further hereinbelow, and that such alternative embodiments would fall within the spirit and scope of the present invention.

LAN 102 includes nodes 104a, 104d residing thereon. (Nodes 104a-104d may collectively be referred to as nodes 104.) It would be appreciated by those of ordinary skill in the art that the particular role played by each of the nodes need not be the same, and may represent servers, workstations, personal computers, or other resources, commonly connected on an enterprise or other private network.

Connectivity of LAN 102 to the Internet 106 may be provided via edge node 108. In particular, edge node 108 may provide access to LAN 102 and enable external users such as user 110 to access resources on LAN 102. For example, user 110, an authorized user, may be an employee working from an external location while on travel for example, or working from home via the employee's Internet Service Provider (ISP).

Additionally, as previously described, such Internet connectivity exposes the enterprise network to vulnerabilities of attack by unauthorized users, here, intruder 112.

For the purposes herein, it may be assumed that intruder 112 has managed to gain access to LAN 102 and as previously mentioned, in an enterprise environment particularly, nodes may have an Intrusion Detection System (IDS) deployed thereon, here represented by IDS 114a-114d. Typically these log the intrusion and alert the system administrator, here represented by administrative host 116. Additionally, in accordance with an embodiment of the present invention, IDS 114a-114d may call an intrusion denial mechanism in accordance with the present inventive principles. Such a mechanism for denying access to an intruder, which may be invoked by an IDS, will be described in conjunction with FIGS. 2 and 3.

Process 200 may be invoked by the IDS in response to activity determined by the IDS to represent behavior indicative of an intruder. For example, an attempt by the intruder to access protected data may trigger the IDS which then invokes process 200. In a Unix (or Unix-like, such as Linux) environment, for example, process 200 may be implemented as a shell script, or other executable file. Process 200 may be executed by an administrative node, such as node 116, FIG. 1. Note that process 200 is a privileged process. That is, process 200 may be a process with root privileges.

In step 202, a user identifier (UID) and connection information are received from the IDS. For example, in a Unix environment, each process has a set of attributes including a UID and a process ID (PID). In particular, the intruder's shell process includes the intruder's UID and a corresponding PID. Connection information may be a socket descriptor. (A socket would be understood by one of ordinary skill in the art to be a logical representation of a network connection. Note that in a Unix environment, the IDS may obtain the socket descriptor associated with the intruder's PID using the netstat command.) In step 204, process 200 takes over input/output (I/O) on the socket. For example, in step 204, process 200 connects to the socket and may then read from and write to the socket. Logically, a socket appears to be a file, and the same functions (e.g. open( ), read( ), and write( )) with respect to opening a file, reading from the file, writing to the file etc. are used to perform the same operations with respect to the socket. Additionally, the intruder's terminal session may typically be connected to the shell, and in step 204, the shell process is killed. Because process 200 is privileged, it may kill the intruder's shell process (using the Unix kill command, for example and the intruder's shell process PID).

Process 200 may then "mimic" the shell as described in steps 206-210. In other words, in steps 206-210 process 200, from the perspective of the intruder, appears to be the (now killed) shell process.

In step 206, a broken connection message is passed back to the intruder. This may be effected in a Unix environment by writing "connection disconnected" or similar text to the socket. Consequently, process 200 gives the appearance that the shell process has been disconnected. Thus, any further activity by the intruder would be expected by the intruder to be with respect to his or her local session. In step 208, in response to any activity, local session responses are returned, and the activity is logged. Thus, in step 208, process 200 appears to the intruder as a local session. Activity may be logged to the system log(syslog ( ) may be used to write messages to the system log.)

In step 210, process 200 waits for the intruder to "telnet" (connect to a shell or other terminal process) back into the edge node. In other words, process 200 listens on the socket for an attempt by the intruder to reconnect and login to the edge node. This may be typically indicated by receipt of the "telnet" keyword and the edge node "name."

In step 212, a login and password prompt is returned to the intruder's terminal session. Again this may be implemented in a Unix environment by writing the corresponding text to the socket. Thus, the intruder's terminal session displays the typical prompt "login:" and in response, the intruder will supply the login name used to gain access to the network via the edge node. Likewise, the intruder's terminal session displays the "pwd:" prompt to which the intruder responds with the password used to access the network. In step 214 the login name and password are recorded, to the system log, for example. In step 216, a login process is forked and in step 218 the data, that is the captured login name and password are piped to the forked process. By forking a process to login to the edge node, as described below, process 200 maintains the connection to the intruder. (In a Unix environment, a pipe is an interprocess communication channel. Fork is a mechanism to create a new, child, process, implemented as a system call.) Process 200 then loops waiting for the forked process to return. As described below, further actions by process 200 depend on the return values from login process 300.

Figure 2A:
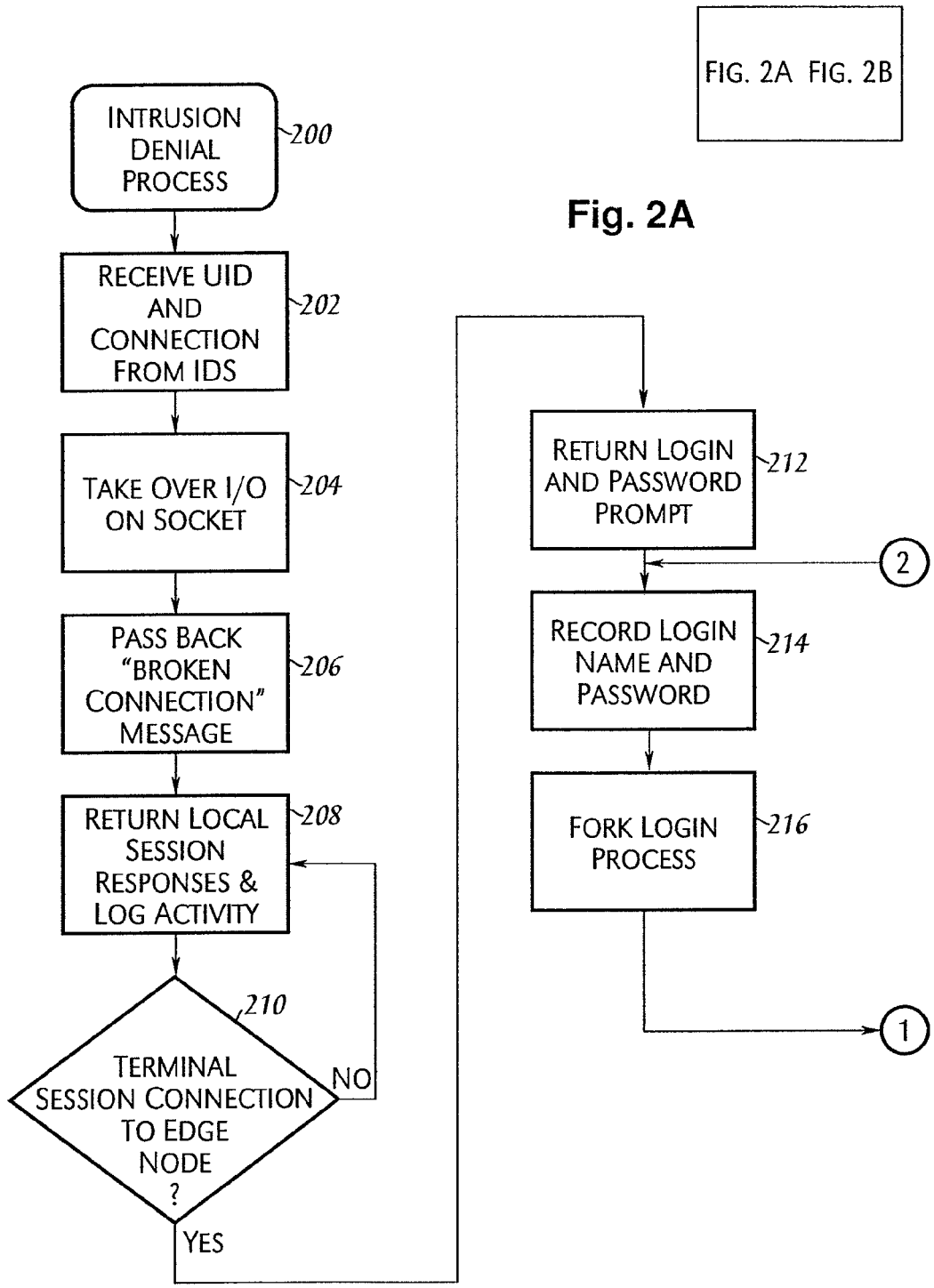
FIG. 2 illustrates, in flowchart form, a portion of a intrusion denial methodology in accordance with an embodiment of the present invention.
Figure 2B:
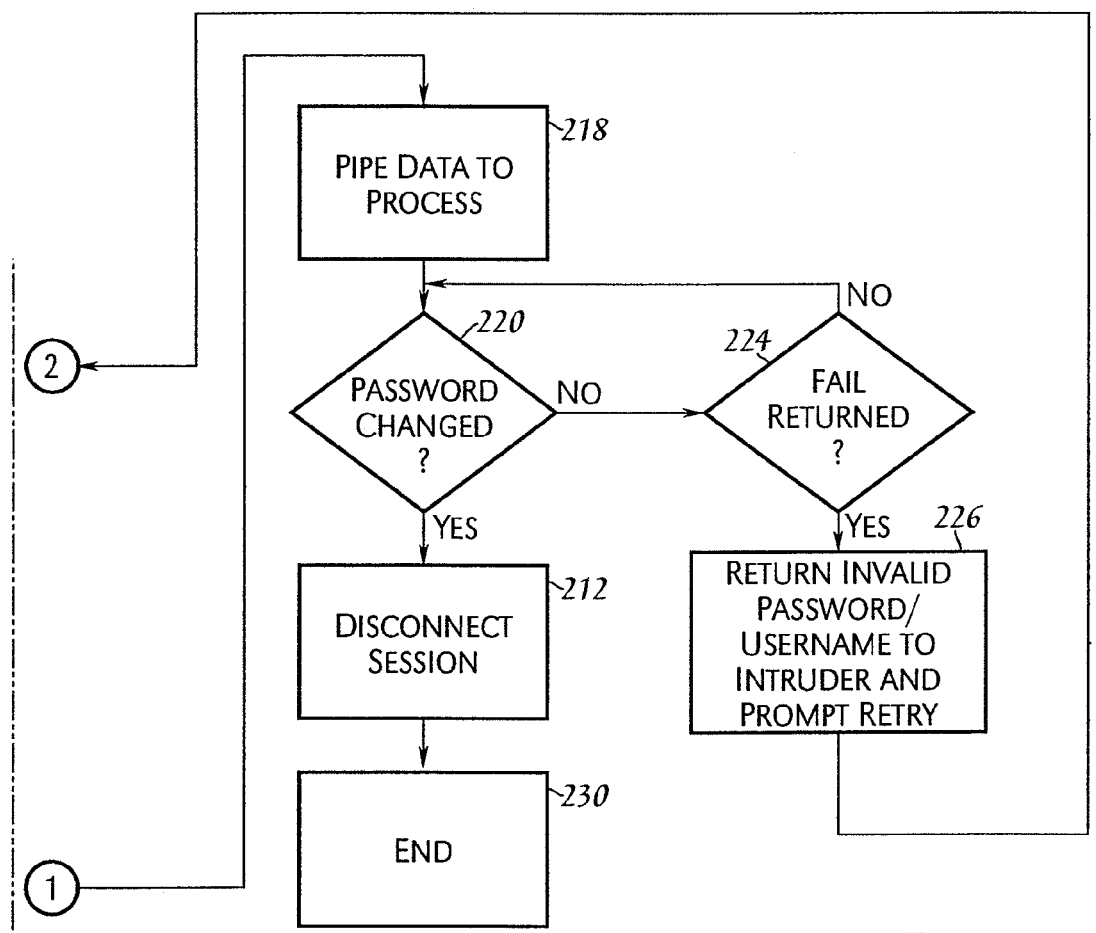
Figure 3:
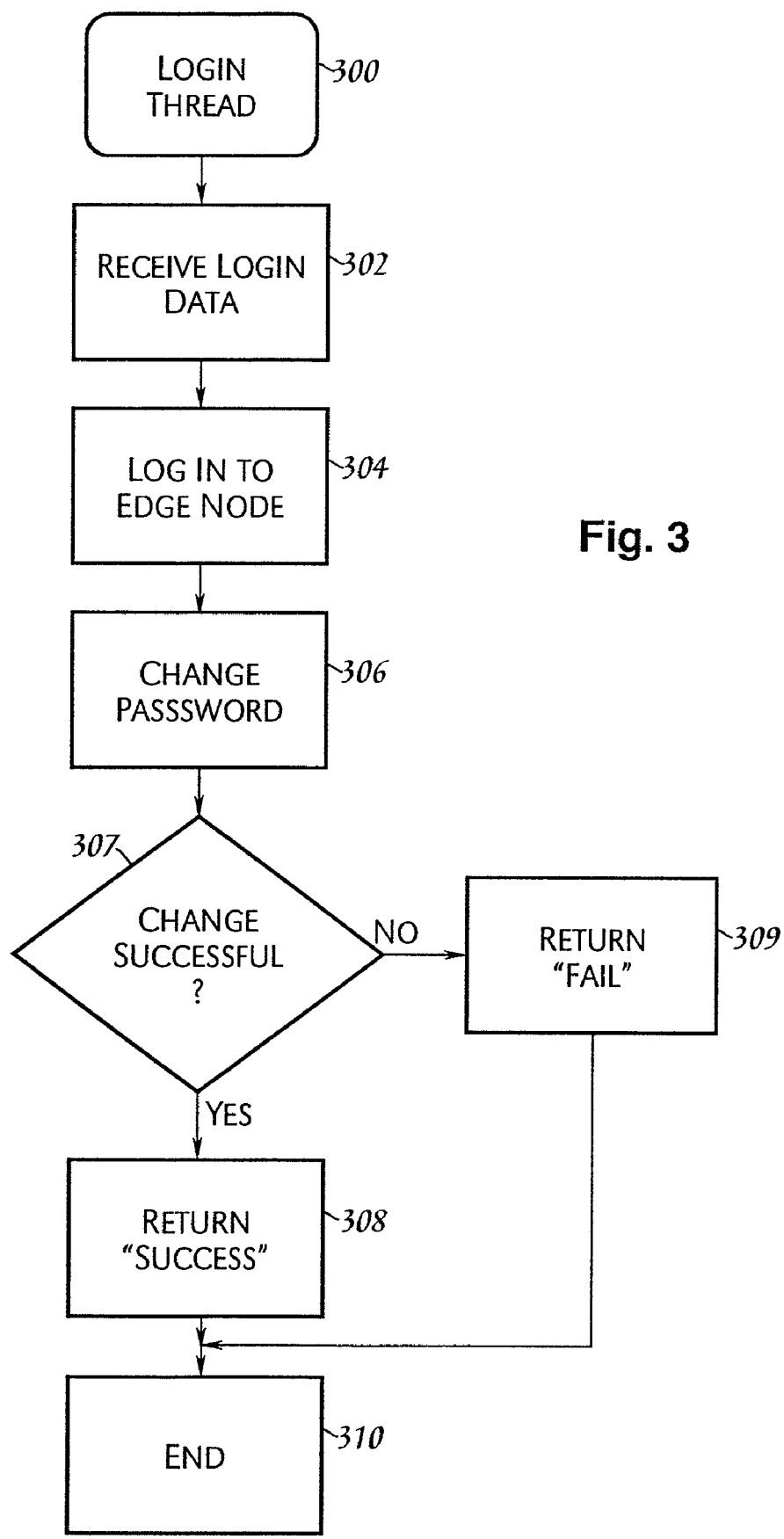
FIG. 3 illustrates, in flowchart form, another portion of the intrusion denial methodology in accordance with an embodiment of the present invention.

Refer now to FIG. 3 illustrating login process 300 which may be forked in step 216 of FIG. 2. Process 300 may be a Unix executable, for example a shell script. In step 302, the piped login data is received. In step 304, the login name and password are used to log into the edge node. In step 306, the password associated with the login name is changed. By changing the password, subsequent attempts by the intruder to log into the system will fail. If the change is successful, step 307, in step 308 a "success" value is returned to process 200, FIG. 2 indicating the password has been successfully changed. If, however, in step 307, the change attempt failed, a "fail" value is returned in step 309. The login may fail if, for example, the intruder makes an error in attempting to login in process 200, FIG. 2, by for example making a typographical error in the username or password Login process 300 then terminates in step 310.

Returning to FIG. 2, pending a return of thread 300, process 200 loops in steps 210 and 224. If the change of the password fails, and thread 300 returns a "fail" (step 309, FIG. 3), process 200 breaks out of the loop via step 224, and returns an invalid password/username reply to the intruder and prompts the intruder to retry, in step 226. Process 200 then returns to step 214.

Conversely, in response to the return of a "success" value from login thread 300, (step 308, FIG. 3), intrusion denial process 200 breaks out of the loop in step 210. In step 222, the session is disconnected.

In this way, subsequent attempts to log in will fail due to the changed password. Upon disconnection of the session, process 200 terminates, step 230.

Figure 4:
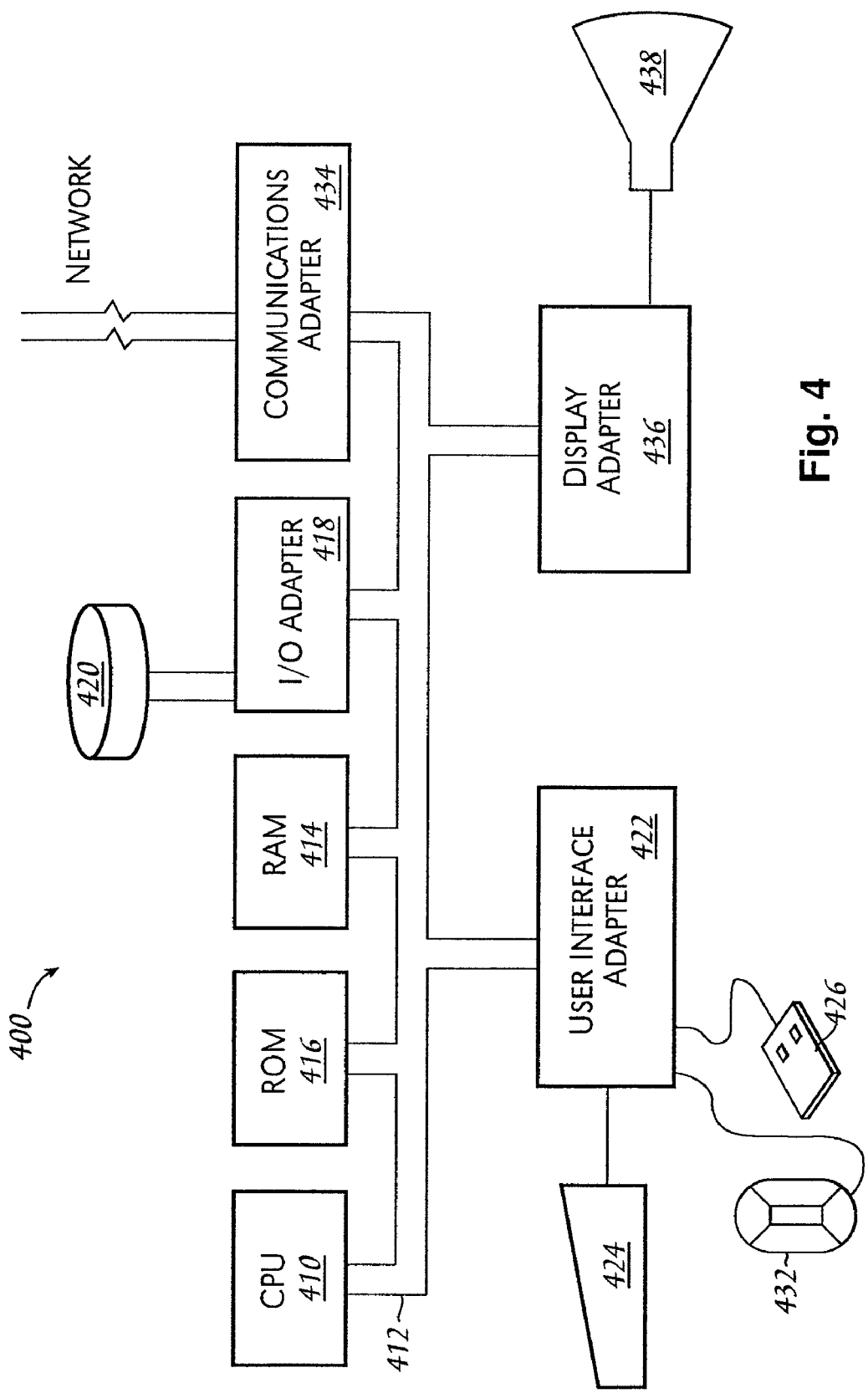
FIG. 4 illustrates, in block diagram form, a data processing system, which may be used in conjunction with the methodologies in FIGS. 2 and 3.

FIG. 4 illustrates an exemplary hardware configuration of data processing system 400 in accordance with the subject invention. The system in conjunction with the methodologies illustrated in FIGS. 2 and 3 may be used to deny intrusion into a data processing system in accordance with the present inventive principles. Data processing system 400 includes central processing unit (CPU) 410, such as a conventional microprocessor, and a number of other units interconnected via system bus 412. Data processing system 400 also includes random access memory (RAM) 414, read only memory (ROM) 416 and input/output (I/O) adapter 418 for connecting peripheral devices such as disk units 420 to bus 412, user interface adapter 422 for connecting keyboard 424, mouse 426, trackball 432 and/or other user interface devices such as a touch screen device (not shown) to bus 412. System 400 also includes communication adapter 434 for connecting data processing system 400 to a data processing network, enabling the system to communicate with other systems, and display adapter 436 for connecting bus 412 to display device 438. CPU 410 may include other circuitry not shown herein, which will include circuitry commonly found within a microprocessor, e.g. execution units, bus interface units, arithmetic logic units, etc. CPU 410 may also reside on a single integrated circuit.

Preferred implementations of the invention include a computer system programmed to execute the method or methods described herein, and a computer program product. According to the computer system implementation, sets of instructions for executing the method or methods are resident in the random access memory 414 of one or more computer systems configured generally as described above. These sets of instructions, in conjunction with system components that execute them may deny unauthorized access to a data processing system as described hereinabove. Until required by the computer system, the set of instructions may be stored as a computer program product in another computer memory, for example, in disk drive 420 (which may include a removable memory such as an optical disk or floppy disk for eventual use in the disk drive 420). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

What is claimed is:

1. A computer program product for denying an intruder access embodied in a non-transitory computer-readable storage medium, the program product comprising instructions for:
   receiving an identifier of a socket corresponding to an intruder terminal session from an intruder detection system;
   passing a broken connection message to the terminal session;
   outputting responses on said socket in reply to intruder input, said responses having characteristics of a local terminal session; and
   listening for a login request from the intruder, said login request directed to an edge node of a data processing network.

2. The computer program product of claim 1 further comprising programming instructions for, if said login request is received, capturing a login identifier and a password in response to the login request.

3. The program product of claim 2 further comprising programming instructions for sending a login prompt on said socket in response to said login request, wherein the login identifier is received in response to said login prompt.

4. The program product of claim 2 further comprising programming instructions for:
   logging into the edge node using the login identifier and the password; and
   changing the password.

5. The program product of claim 4 further comprising programming instructions for forking a subprocess, wherein the steps of logging into the edge node and changing the password are performed by the subprocess.

6. The program product of claim 5 further comprising programming instructions for disconnecting the socket.

7. The program product of claim 5 further comprising programming instructions for:
   returning a login error message to said intruder if the step of changing the password fails; and
   prompting the intruder to retry a login.

8. A data processing system for denying an intruder access comprising:
   circuitry operable for receiving an identifier of a socket corresponding to an intruder terminal session from an intruder detection system;
   circuitry operable for passing a broken connection message to the terminal session;
   circuitry operable for outputting responses on said socket in reply to intruder input, said responses having characteristics of a local terminal session; and
   circuitry operable for listening for a login request from the intruder, said login request directed to an edge node of a data processing network.

9. The data processing system of claim 8 further comprising circuitry operable for, if said login request is received, capturing a login identifier and a password in response to the login request.

10. The data processing system of claim 9 further circuitry operable for sending a login prompt on said socket in response to said login request, wherein the login identifier is received in response to said login prompt.

11. The data processing system of claim 9 further comprising:
   circuitry operable for logging into the edge node using the login identifier and the password; and
   circuitry operable for changing the password.

12. The data processing system of claim 11 further comprising circuitry operable for forking a subprocess, wherein the steps of logging into the edge node and changing the password are performed by the subprocess.

13. The program product of claim 12 further comprising circuitry operable for logging intruder activity on the socket.

* * * * *